May 21, 1963 R. A. CONRAD 3,090,412
EGG DRILLING MACHINE
Filed Nov. 24, 1959 6 Sheets-Sheet 1

INVENTOR.
RENÉ ARTHUR CONRAD
BY Alexander Riaboff
ATTORNEY

May 21, 1963 R. A. CONRAD 3,090,412
EGG DRILLING MACHINE
Filed Nov. 24, 1959 6 Sheets-Sheet 2
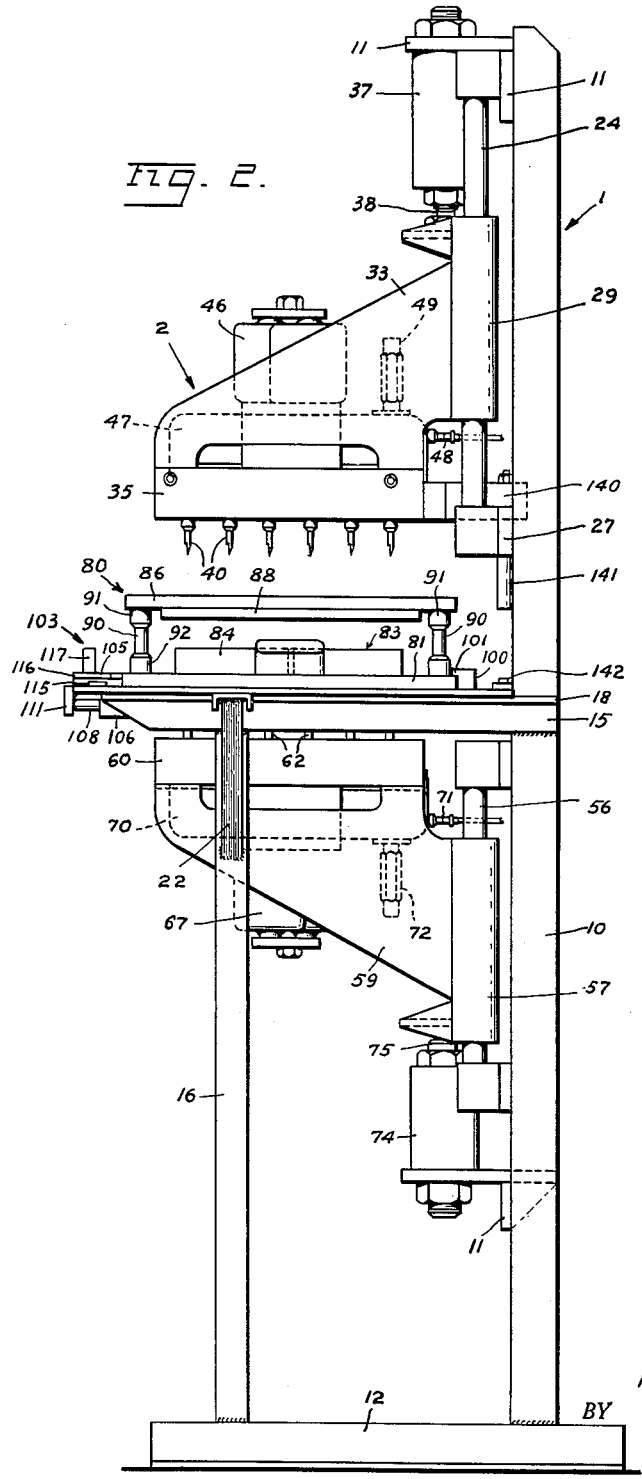
INVENTOR.
RENÉ ARTHUR CONRAD
BY Alexander Riaboff
ATTORNEY May 21, 1963
R. A. CONRAD
3,090,412
EGG DRILLING MACHINE
Filed Nov. 24, 1959
6 Sheets-Sheet 3
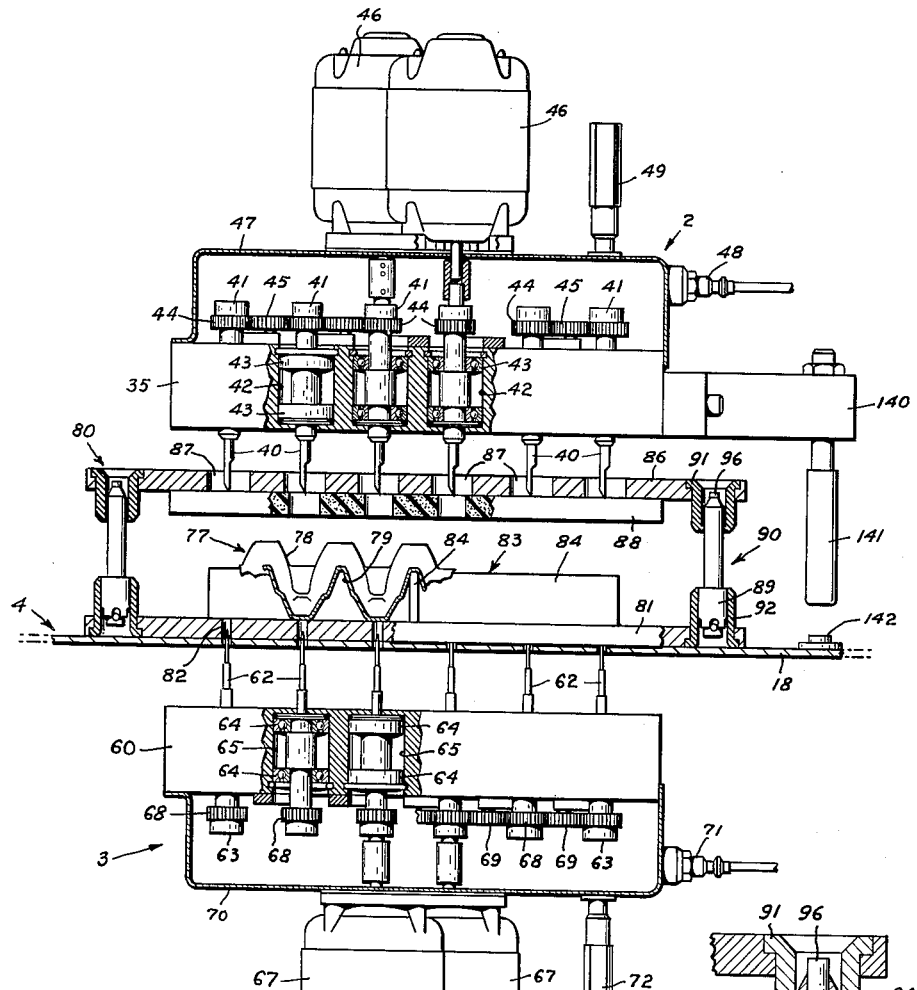
INVENTOR.
RENÉ ARTHUR CONRAD
BY Alexander Riaboff
ATTORNEY May 21, 1963

R. A. CONRAD 3,090,412

EGG DRILLING MACHINE

Filed Nov. 24, 1959

6 Sheets-Sheet 4

INVENTOR.
RENÉ ARTHUR CONRAD
BY Alexander Riaboff
ATTORNEY

May 21, 1963

R. A. CONRAD 3,090,412

EGG DRILLING MACHINE

Filed Nov. 24, 1959

6 Sheets-Sheet 5

INVENTOR.
RENE ARTHUR CONRAD
BY Alexander Riaboff
ATTORNEY

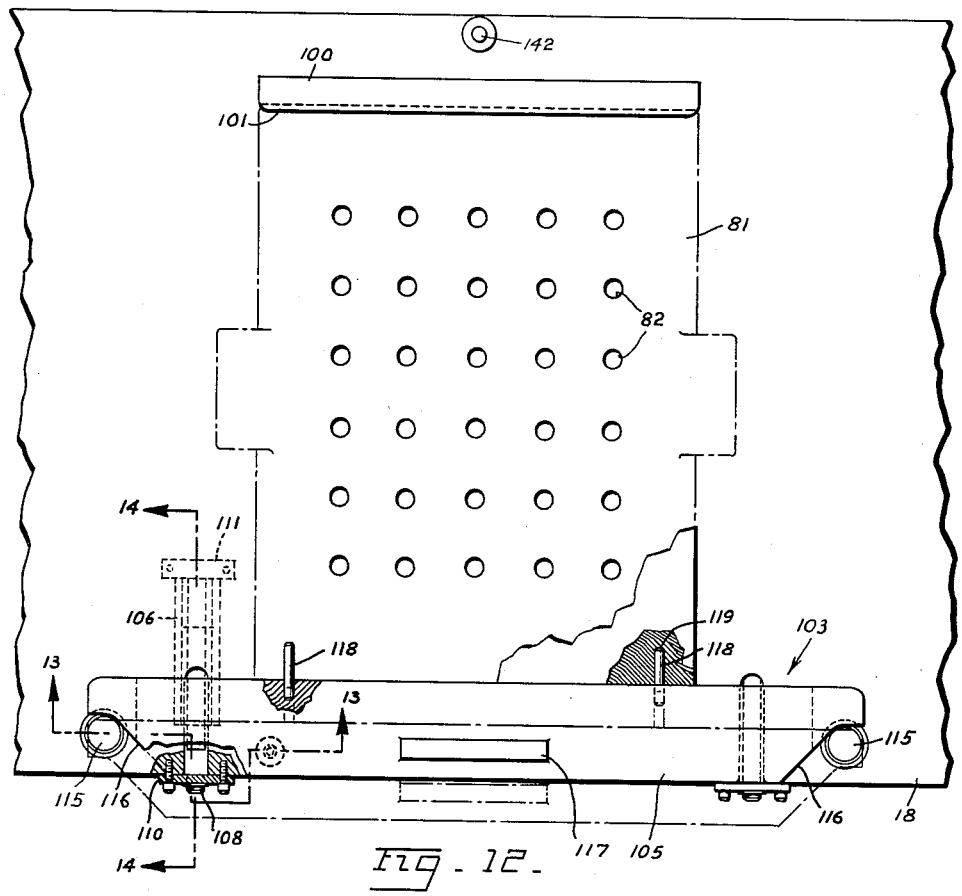

United States Patent Office 3,090,412
Patented May 21, 1963

3,090,412
EGG DRILLING MACHINE
Rene Arthur Conrad, 2510 Humphrey Ave.,
Richmond, Calif.
Filed Nov. 24, 1959, Ser. No. 855,215
5 Claims. (Cl. 146—2)

This invention relates to an egg drilling machine.

The primary object of this invention is to provide an egg drilling machine for perforating eggs on both ends for the purpose of evacuating the contents thereof.

Another object of this invention is to provide a machine which in a single operation drills a plurality of eggs on both ends.

Another object of this invention is to provide a machine which is automatic in operation, the cycle of operation including advancing of the drills to the eggs from the top and from the bottom, drilling the same from both ends and withdrawing of the drills from the eggs into the starting position.

Another object of this invention is to provide a machine with a safety device built in it, so that the machine can be started on its cycle of operation only when the egg container is in its proper position and the eggs are ready for drilling.

Another object of this invention is to provide a new drill for perforating eggs without cracking the same.

Another object of this invention is to provide a special retaining mechanism for egg containers used in connection with this machine.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

Figure 1:
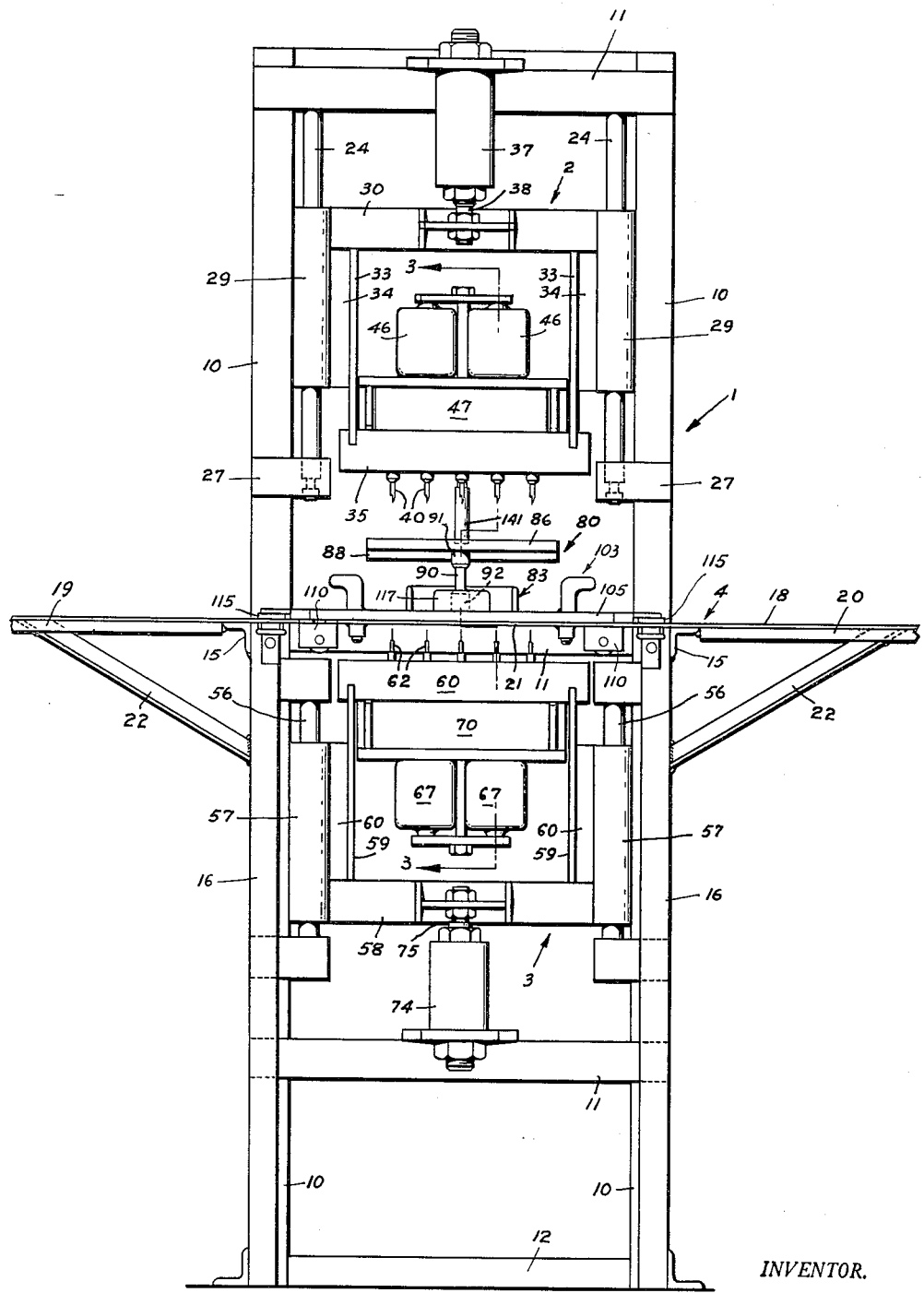
Figures 8, 9, 10:
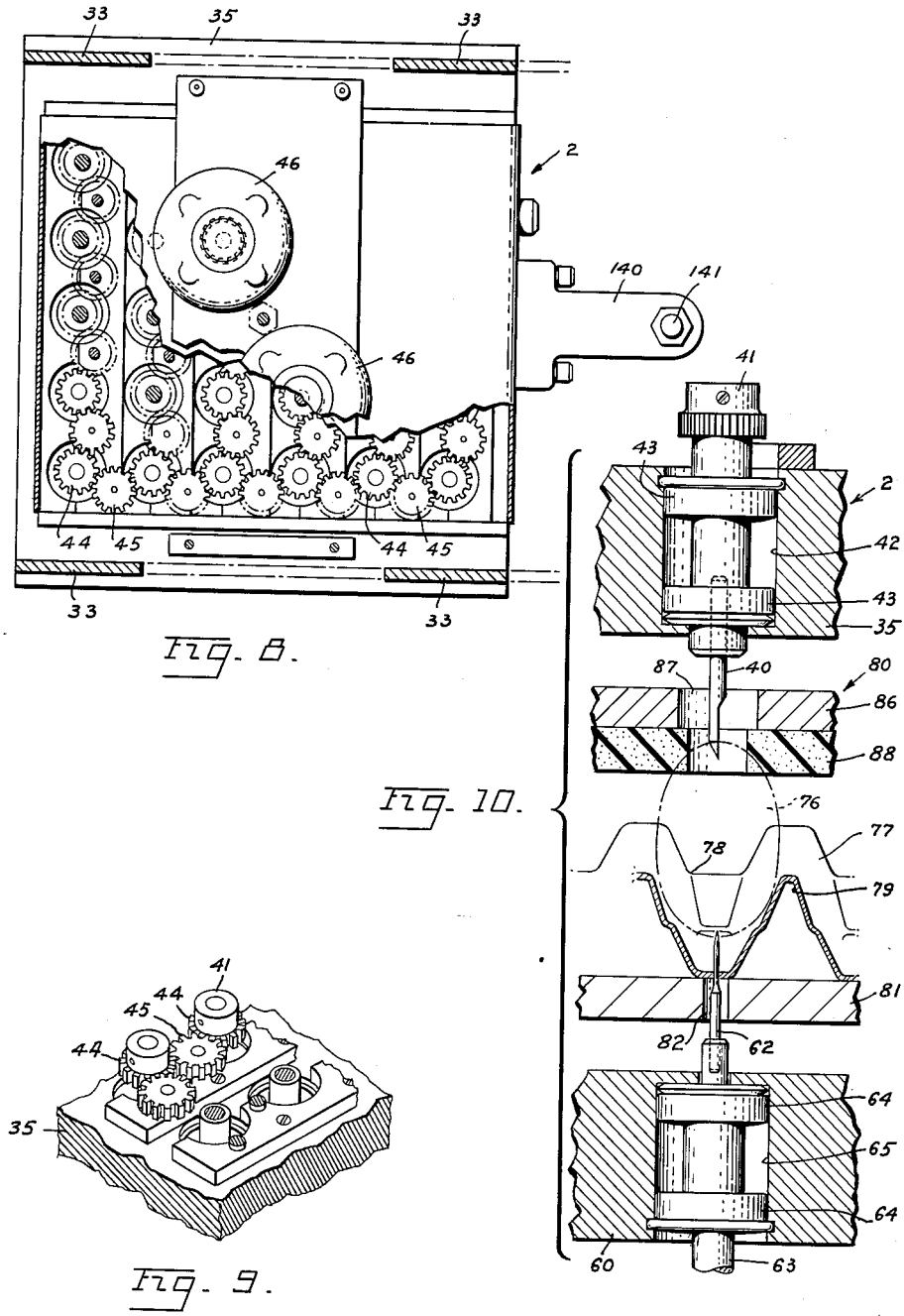
Figure 11:
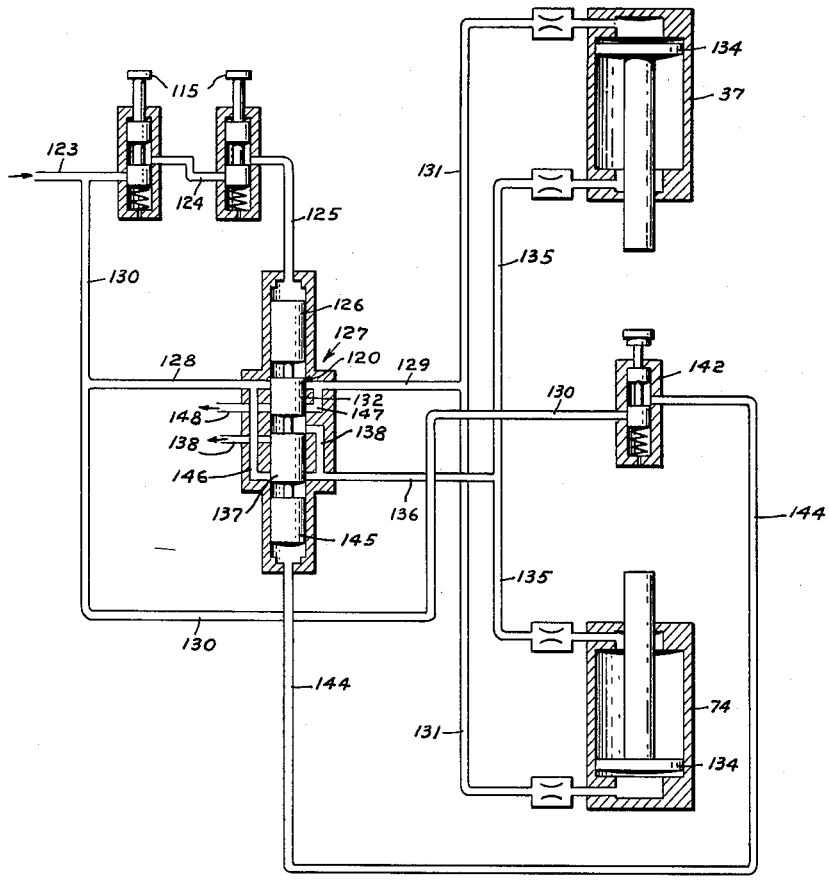

This invention is illustrated in drawings forming a part of this specification in which:

FIG. 1 is a front elevation of the machine.
FIG. 2 is a side elevation of the machine.
FIG. 3 is a partial vertical cross-section of the machine, some parts being shown in elevation, taken on the line 3—3 of FIG. 1.
FIG. 4 is an enlarged front view of the top egg drill.
FIG. 5 is an enlarged side view of the top egg drill shown in FIG. 4.
FIG. 6 is a front view of the lower egg drill.
FIG. 7 is an enlarged vertical cross-section of a pip pin in an egg retaining device.
FIG. 8 is a top plan view of the upper egg drilling unit, some parts being shown in section.
FIG. 9 is a partial perspective view of the gear arrangement of the upper egg drilling unit.
FIG. 10 is an enlarged vertical sectional view of the upper and lower drills shown at their maximum of penetration of an egg.
FIG. 11 is a diagram of the pneumatic system of the machine.
FIG. 12 is a plan view of the safety device.
FIG. 13 is an enlarged sectional view taken along the line 13—13 of FIG. 12, and
FIG. 14 is an enlarged sectional view taken along the line 14—14 of FIG. 12.

In general my machine consists of a frame 1, preferably made of metal, on which are slidably mounted an upper egg drilling unit 2 and a lower egg drilling unit 3. A table 4 is secured to the frame 1 between said units for supporting a carton of eggs during the drilling operation. The units 2 and 3 move simultaneously toward said eggs and drill the same on both ends at the same time, whereupon the units automatically withdraw and resume their initial positions, thus completing the cycle of operation. A pneumatic system 5 is provided to control and activate the movements of said drilling units during said cycle of operation.

In detail, the frame 1 comprises two vertical posts 10 connected by a plurality of horizontal braces 11 and resting on a base 12. Secured to said frame substantially in the middle thereof is the table 4 consisting of a pair of horizontal angle irons 15, each of which is welded or otherwise secured to the outer side of said posts 10, and extending forwardly therefrom parallel to each other. The front ends of the angle irons 15 are supported by legs 16 resting on the base 12. A table top 18 rests on said angle irons 15 and extends on both sides beyond the central portion 21, forming table extensions 19 and 20, which are supported by braces 22. The table 4 supports a carton 77 of eggs.

The frame 1 slidably carries the upper egg drilling unit 2 by means of a pair of vertical bars 24 secured to the upper half of said frame parallel to the posts 10, the upper ends of said bars 24 being secured to the top brace 11 and the lower ends to the fittings 27, which in turn are welded to said posts. A slide 29 is arranged on each of said bars 24, the top of both slides being connected by a connecting plate 30 so that both sides move on said bars as a unit. A pair of parallel supports 33 are welded to said connecting plate, extending downwardly and forwardly, which supports are also securely connected to the slides 29 by means of intermediate plates 34 welded to said slides and supports. The latter carry secured to their lower ends an upper drill block 35 with a drilling mechanism hereinafter described.

The upper drilling unit 2 is moved up and down by means of a pneumatic cylinder 37, which is secured at its upper end to the upper brace 11 at the middle thereof. The cylinder 37 includes a shaft 38 extending therefrom downwardly and integral with a piston 39 inside said cylinder. The lower end of said shaft is secured to the connecting plate 30. Thus when the piston is forced by compressed air upwardly or downwardly, the upper drilling unit 2 moves accordingly.

The upper drilling unit includes a plurality of egg drills 40, preferably thirty in number, arranged in five rows of six drills in each. Each drill is fastened in a chuck 41 which is rotatably arranged in a pair of bearings 43, the latter being inserted in a bore 42 in the drill block 35. Each chuck has a gear 44 secured to its upper end by which the chuck and the drill carried thereby are rotated. The gears 44 are interconnected to spur gears 45 and are preferably rotated by a pair of high speed electric motors 46, secured to the block and to one of the chucks 41.

The gears are enclosed by a closure 47 forming with said drill block a gear box which is lubricated and cooled by a stream of oily mist blown at a low pressure through a valve 48. The closure carries a safety pressure valve 49 which opens automatically whenever the pressure in said gear box exceeds a certain limit.

The upper drill 40, as shown in FIGS. 4 and 5, represents a cylindrical body about a quarter of an inch in diameter and has its lower portion reduced longitudinally to one half diameter in cross-section, as shown at 50. The half cylindrical end is sharpened into a half cone, as shown at 51. The drill 40 does not crack eggs when rotated at high speed, such as 5000 revolutions per minute, even if it meets the egg surface at an angle.

The lower egg drilling unit 3 is constructed the same way as the upper unit 2. It includes a pair of parallel sliding bars 56 arranged below the table 4 which bars are parallel to the posts 10 and secured thereto. A slide 57 is arranged on each of said bars, the lower ends of said slides being connected by a cross plate 58. The latter carries a pair of supports 59 welded thereto and to a pair of intermediate plates 61 which in turn are welded to the slides 57.

The supports 59 carry on their upper ends a drill block 60. The latter is provided with lower drills 62 which are directed upwardly. The drills 62 are removably carried in drill chucks 63 rotatable in upper and lower bearings 64 inserted in bores 65 in said drill block. The drills are rotated by preferably a pair of high speed electric motors 67 which are directly connected to two of the chucks 63. Each of said chucks carries a gear 68 which gears are operatively interconnected by spur gears 69. Therefore, said motors rotate all gears simultaneously and at a uniform speed. The provision of two motors for rotation of the upper and lower drills assures smooth operation and eliminates the torque problem. The gears 68 and 69 are enclosed by a closure 70 and are lubricated and cooled by oil mist introduced through a valve 71. A safety valve 72 is also provided to prevent the building up pressures over desired limit.

The lower drilling unit 3 is moved up and down by means of a pneumatic cylinder 74 secured to the lower brace 11. The latter cylinder operates a shaft 75 extending therefrom upwardly from a piston 73 inserted in said cylinder, said shaft being adjustably secured to the cross plate 58. A shaft 75 moves the lower drilling unit 3 upwardly while the upper drilling unit 2 is moved downwardly to drill the eggs placed on the table 4 in a carton, simultaneously from both ends, as hereinafter shall be described in detail.

The lower drill 62 is about one eighth of an inch in diameter and has a sharp end penetrating an egg only about one eighth of an inch and just raising the inner pliable membrane, without puncturing the same. When the drill is withdrawn, the contents of the egg do not leak out.

The eggs 76 are packed in a large standard carton 77 opened on the top, containing preferably thirty eggs, arranged in five rows of six eggs each. Each egg is in a separate cell 78, the rows of the cells being separated from each other by passages 79. The eggs are drilled while being in said carton. The lower drills 62 penetrate through the cells' bottom to reach the eggs, as shown in FIG. 10.

The carton 77 is centered on the table 4 by an egg centering device 80. The latter consists of a bottom plate 81 having a plurality of openings 82 therein, through which the lower drills 62 pass to reach the eggs. The bottom plate 81 is provided with a carton centering cross 83 consisting of two vertical strips 84 secured to said plate in form of a cross at substantially the middle thereof. The carton 77 with eggs is placed on the same in such a manner that said strips enter the passages 79 between the rows of the cells 78, and the carton is located in the center of said plate.

The device 80 also includes a top plate 86 which is arranged above said plate 81. The plate 86 is also perforated, as shown at 87, through which perforations the upper drills 40 pass to reach the eggs in the carton. The bottom of the plate 86 is covered with a layer of foam rubber 88 having perforations therein opposite the perforations 87 in the top plate. When the carton of eggs rests on the bottom plate 81, the foam rubber gently presses on the tops of said eggs, as shown in FIG. 9.

The bottom and the top plates 81 and 86 respectively are connected by a pair of pip pins 90 arranged transversely near the edges thereof at its center line. The pip pin 90 is a standard article designed and sold by Aviation Development Inc. under No. B815XD and it forms no part of this invention. Therefore, said pip pin shall be described only as far as it is necessary for the purpose of the disclosure of this invention.

The pip pin is firmly secured to the bottom plate 81 through a bushing 89 pressed into a collar 92, the latter being also pressed into said bottom plate. The upper end of said pip pin is slidably arranged in an upper collar 91 which is pressed into the top plate 86. The upper collars 91 and the plate 86 are slidable downwardly on said pip pins, but the upper movement of said collars is limited by a pair of balls 93 protruding from said pip pin into a space 94 between said pin and said collar, which balls abut the lip 95 provided at the bottom of said collar around said pin whenever said plate is moved upwardly. The pin 90 is provided with a spring pressed rod 96 slidable therein and having a pocket 97 thereon into which the balls 93 roll when said rod is pressed downwardly, thus releasing the collar 91. Thereupon the top plate 86 may be taken off said pins. It is believed that the above description is sufficient to understand the function of said pip pin.

The egg centering device 80 is retained on the table 4 in the following manner. A rear guide 100 is provided in the rear of the central section 21 of the table 4 near the posts 10, against which the egg centering device 80 abuts when properly placed on said table. The rear guide 100 is formed with a lip 101 extending forwardly under which the bottom plate 81 of the device 80 enters. At the front of the table is arranged a locking device 103, which in cooperation with said rear guide 100 correctly centers the egg centering device 80 in relation to said upper and lower drills and renders the device inoperative until said egg centering device is correctly placed on said table. The locking device 103 includes a front guard 105 which is slidable backward and forward on the front end of said table top 18. The motion of the guard is controlled by a pair of slides 106, each having a ball bushing 107 sliding on a shaft 108. The slide 106 is connected to the guard 105 by a connecting plate 109. The shaft 108 is carried by a front plate 110 secured to the front of the table top 18 and a back plate 111 secured to the underside of the table top 18.

A pair of manually pressed valves 115 is provided in said table near the front edge thereof and in close proximity to the ends of the guard 105, the ends of which are cut off at an angle as shown at 116 to expose said valves. The tops of the valves 115 protrude above the surface of the table top 18 and the ends of the guard 105 are recessed on its under surface at 114.

In order to place the egg centering device 80 on the table top 18, the operator pulls the guard 105 outwardly by a handle 117, provided on the top thereof, and places the device 80 on the table top and pushes it back so that the edge of the bottom plate 81 of said device enters under the lip 101 of the guide plate 100 and abuts the latter. Thereafter the guard 105 is moved toward the device 80 and the same is adjusted transversely so that a pair of pins 118, carried by the rear edge of said guard, are located opposite corresponding holes 119 in the bottom plate 81 of the device 80. The guard 105 is moved back until a spring pressed retaining pin 121 secured to the underside of the table top 18 enters an indentation 122 in the bottom of the guard. When the guard 105 is in its proper position, the valves 115 are exposed and the operator presses both said valves simultaneously to start the operating circle. As both valves are covered by the ends of the guard 105, when the device 80 is being placed on the table top 18, the operator cannot press said valves and start the cycle of operation. Thus the operator cannot by an accident or otherwise start the cycle of operation until and unless the egg centering device 80 is properly placed and locked on the table 14.

The upper and lower drills are constantly rotating when the device is in operation.

When the operator presses the valves 115, compressed air passes from a source, not shown in the drawings, to a pipe 123, and therefrom through said valves 115, connected by a pipe 124 and through a pipe 125 to a pilot cap 126 of a four way pilot valve 127 having a double piston 120 therein. The cap 126 pushes said double piston 120 downwardly viewing FIG. 11 and thus establishes communication between a pipe 128 and a pipe 129 connected to said valve opposite the first piston 132 of said double piston. The pipe 128 is connected to said source of compressed air by a pipe 130 which in turn is connected to the pipe 123. The pipe 129 is connected to a pipe 131, the ends of which are connected to the top of the air pressure cylinder 37 and the bottom of the air pressure cylinder 74, thus forcing pistons 134 in said cylinders and the respective shafts 38 and 75 connected thereto down and up respectively. The latter push the upper drilling unit 2 downwardly and the lower drilling unit 3 upwardly, thus forcing the upper and lower drills into the eggs. The air contained in the cylinders on the other side of the pistons is evacuated through a pipe 135 connected to the lower and upper ends of the cylinders 37 and 74 respectively, which pipe is connected by a pipe 136 to the valve 127 against the second piston 137 of said double piston, which at that moment opens a discharge pipe 138, through which the air is exhausted.

The block 35 of the upper drilling unit 2 is provided with an arm 140 to which is adjustably secured a rod 141, travelling with said unit up and down. A spring pressed valve 142 is secured to the table top 18 right under said rod 141. When said rod reaches its lowermost position, it pushes said valve 142 down and thus establishes momentarily a pressure line from the pipe 130 through said valve 142, pipe 144, to a second pilot cap 145 which is forced to move upwardly, and thereby moves said double piston 120 to open a passage between the pipe 136 and a pipe 146 connected to the pipe 128. The compressed air passes through said pipe 128, pipe 146, the valve 127, pipe 136 to the bottom and the top of the cylinders 57 and 74 respectively and forces the pistons 134 up and down respectively, thus pushing the drilling units 2 and 3 away from the eggs. At the same time the piston 132 of the double piston 120 uncovers a branch pipe 147 connected with the pipe 129 which communicates with the top and the bottom of the cylinders 37 and 74 respectively, and an exhaust pipe 148, thus permitting the air from the top and the bottom of said cylinders respectively to be exhausted.

After the eggs are drilled, the egg centering device 80 is removed from the table 4 with the carton and the eggs and moved to an egg evacuating machine, which shall be the subject matter of another patent application.

I claim:

1. An egg drilling machine for drilling simultaneously a plurality of eggs on both ends, comprising a frame, a table secured to said frame, means on said frame for securely holding a carton of eggs in a predetermined position on said table; an upper drilling unit located above said table, including a plurality of drills, each drill being located over a respective egg in said carton, means for rotating said drills, a pneumatic cylinder secured to said frame and having a shaft depending therefrom secured to said drilling unit for moving the same downwardly and upwardly for drilling the upper ends of said eggs; a lower drilling unit, located under said table, including a plurality of drills, each drill being located under a respective egg in the carton, means for rotating said drills, a pneumatic cylinder secured to said frame and having a shaft extending therefrom and secured to said lower drilling unit for raising and lowering said unit for drilling the lower ends of the eggs in the carton; pneumatic means including a four way valve operatively connected to said cylinders for synchronizing the movements of said drilling units to drill the eggs simultaneously on both ends, and means for preventing said units from moving toward the table until said carton is properly placed in said predetermined position.

2. An egg drilling machine as described in claim 1, wherein the last mentioned means includes a pair of manually operated valves located on the table some distance apart from each other for starting the cycle of operation of said units, a slidable guard plate for locating the carton, said plate being slidable on the table and arranged to cover said valves while the carton of eggs is being arranged on the table, and to expose said valves after the carton of eggs is placed in the predetermined position to permit the manual operation thereof for starting the cycle of operation of said machine.

3. An egg drilling machine as described in claim 2, wherein the last mentioned pair of manually operated valves is operatively connected with the four way valve for causing said valve to operate the pneumatic means to move and synchronize the motion of the upper and lower drilling units.

4. An egg drilling machine for drilling simultaneously a plurality of eggs on both ends, comprising a frame, a table secured to said frame, means on said frame for securely holding a carton of eggs in a predetermined position on said table; an upper drilling unit located above said table, including a plurality of drills, each drill being located over a respective egg in said carton, means for rotating said drills, a lower drilling unit located under said table, including a plurality of drills for drilling the lower ends of said eggs, each lower drill being located under a respective egg in the carton, means for rotating said drills; pneumatic means for lowering and raising the upper drilling unit, for raising and lowering the lower drilling unit and synchronizing their respective motions, including a pneumatic cylinder for each unit secured to the frame, each cylinder having a movable shaft therein secured to the respective unit; a four way valve operatively connected by pipes with the tops and bottoms of said cylinders to cause said shafts to move out and in said cylinders, a pair of manually operated valves located on the table some distance apart from each other for manually starting the cycle of operation of said units, a return valve arranged on the machine, means for operating the same when the units reach their most advanced position to return said units to their initial positions, and means for operating said four way valve, said pair of manually operated valves and said return valve being operatively connected to the last mentioned means.

5. An egg-drilling machine electrically and pneumatically operated and controlled, comprising
a frame;
an upper and a lower drilling unit slidably arranged on said frame with freedom of upward and downward movement,
each drilling unit having a plurality of drills arranged in rows for drilling upper and lower ends of a carton of eggs respectively;
electric motors for rotating said drills carried by said units;
a stationary table secured to said frame between said drilling units,
a device for centering a carton of eggs on said table in relation to said drills,
a pneumatic cylinder for each drilling unit for moving the latter up and down,
means for synchronizing the movements of the drilling units for simultaneous drilling said eggs on both ends including:
a pair of manually operated starting valves,
a four way pneumatic pilot valve having a double piston therein,
said pilot valve, starting valves and cylinders being so interconnected as to actuate the cylinders whenever the starting valves are operated, and thereby to cause said drilling units to advance simultaneously toward the table for drilling the eggs in the carton, a spring pressed valve actuated by one of the drilling units and operatively connected to said pilot valve for moving the double piston therein to cause the cylinders to retract said drilling units simultaneously from said carton to their initial positions;

and means for preventing the actuating of the manually operated starting valves until the device for centering a carton of eggs is placed in a predetermined position.

References Cited in the file of this patent

UNITED STATES PATENTS

| | | |
|---|---|---|
| 1,710,744 | Roe | Apr. 30, 1929 |
| 2,172,419 | Thomas | Sept. 12, 1939 |
| 2,289,855 | Ralston | July 14, 1942 |
| 2,441,763 | Hertz | May 18, 1948 |
| 2,485,035 | Chensky | Oct. 18, 1949 |
| 2,507,667 | Haller | May 16, 1950 |
| 2,575,584 | Cohen | Nov. 20, 1951 |
| 2,640,379 | Graves | June 2, 1953 |
| 2,641,265 | Grady | June 9, 1953 |
| 2,897,696 | Tisserant | Aug. 4, 1959 |

FOREIGN PATENTS

| | | |
|---|---|---|
| 1,001,875 | Germany | Jan. 31, 1957 |